Figures 1, 2:
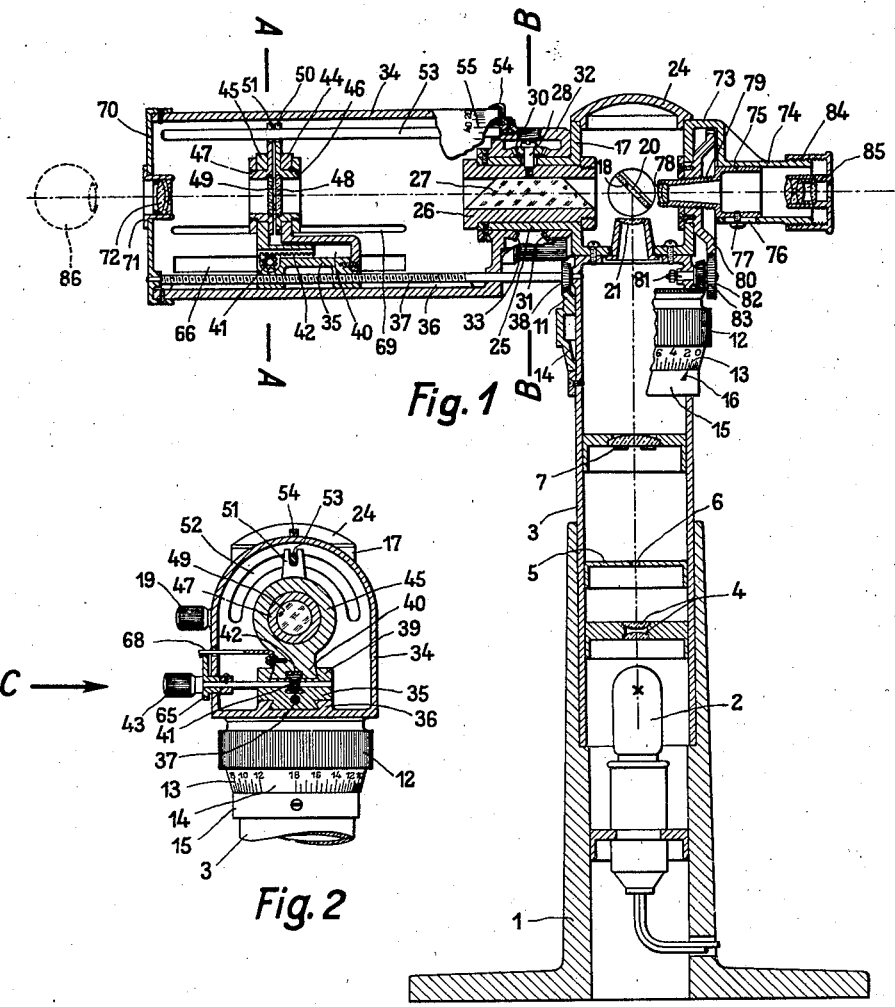

Sept. 13, 1932.    H. HARTINGER    1,877,238
OPHTHALMIC INSTRUMENT
Filed Jan. 5, 1931    2 Sheets-Sheet 1

Inventor:
Hans Hartinger

Sept. 13, 1932.  H. HARTINGER  1,877,238
OPHTHALMIC INSTRUMENT
Filed Jan. 5, 1931   2 Sheets-Sheet 2

Inventor:
Hans Hartinger

Patented Sept. 13, 1932

1,877,238

UNITED STATES PATENT OFFICE

HANS HARTINGER, OF JENA, GERMANY, ASSIGNOR TO FIRM CARL ZEISS, OF JENA, GERMANY

OPHTHALMIC INSTRUMENT

Application filed January 5, 1931, Serial No. 506,682, and in Germany January 15, 1930.

In the well-known instruments for objectively determining the refractive power of the principal point of the eye, and the vertex refraction of the spectacle lens required to correct ametropia, by finding the locus of the images of surface elements of the fundus of the eye by means of an optical observation device, the surface elements of the eye have been illuminated by a light source axially disposed in the path of illuminating rays and having its current of light divided by deviating means into several separate non-axial partial pencils of rays, unless preference were given to a non-axial light source. In the path of illuminating rays a test object was inserted which was imaged on the fundus of the eye by a lens system and the optical system of the eye, which two systems imaged in the reverse way surface elements of the fundus of the eye together with the image of the test object, thus allowing to determine by means of the position of this image the refractive power of the eye and of the spectacle lens required. The test object used was either a body or the image of a body produced by an optical system.

The present invention aims at providing an instrument of the said kind which has a material test object that can be adjusted along and is rotatable about the optical axis. According to the invention this test object consists of two test marks which are displaceable in the direction of the optical axis and rotatable about the same; moreover the said test marks lie in planes perpendicular to the optical axis and allow of being given the mutual distance zero. To the oculist examining an eye afflicted with ametropia this arrangement offers the advantage of finding the refractive powers in the two planes of the principal section so to speak simultaneously by coordinating the test marks to one each of the two planes of the principal section and leaving the first adjustment unaltered in order to have it available when the second adjustment takes place. In contradistinction thereto, the method used in the instruments known so far, viz. to adjust twice one single test object according to the refractive powers in the two planes of the principal section makes it necessary to disarrange the first adjustment before the second one can take place and thus allows the eye under examination to meanwhile alter its accommodation without being noticed, which may give rise to a wrong measuring result. The astigmatic difference ascertained in both planes of the principal section may therefore partially consist in an alteration in the refractive power, which is due to another accommodation of the eye, and this error will not allow being discovered in a simple way.

For the examination of eyes the optical system of which is of axially symmetric construction, it is convenient to so interconnect the two test marks of the new instrument that they permit of being displaced also conjointly. Similar to those in the known instruments, the test marks of that according to the invention are line marks which substantially coincide with one each of the diameters of the field of view in such a manner that they cross each other perpendicularly. Use is made only of the non-axial parts of these marks as far as these parts are struck by non-axial pencils of illumination rays. For this reason it is advisable to prevent the eye from receiving too much light by reducing the test marks to the size of their illuminated parts and to accordingly interrupt them in their axial portions. In conformity with this division of the marks it is convenient to have in all four pencils of illumination rays.

Each of these four or of any other chosen number of partial pencils of rays would illuminate the test object all over with the light directed through the deviating means, and of each part of the test marks the same number of images would appear on the fundus of the eye. However, in general, this plurality of images will not be desired because on the very restricted surface of the fundus of the eye these images would cover each other at least partly and thus might occasion errors in the result obtained by the examination with the instrument. For this reason a restricted number of images, generally two at most, must be aimed at. The adjustment eventually may be facilitated by double images, for instance when in the field of view of the instrument the two images are at both sides of the test mark and are brought to coincidence with the same. The preference, however, will be given to one single image of the test mark. Such single image of the test mark is obtained by providing in the path of the illumination rays stops which are so apertured that, regardless of the position of the test marks, each part of these marks is illuminated by only one of the non-axial pencils of rays (and preferably always by one and the same pencil).

Accordingly, the shape of the stop apertures depends first of all on the amount by which the test marks can possibly be displaced and turned. Fixed stops will often not permit of having each part of the test marks illuminated by one and the same pencil of illumination rays without the illuminated surfaces covering each other at least partially, and for this reason it must be tried to solve the problem by making the stops rotatable together with the test object.

Instead of mechanically, the stops may rotate optically, that is to say the instrument may be so constructed as to allow of the non-axial pencils of rays being turned in the required manner by having a rotatable reflecting system coupled with the test object in such a manner that the test object rotates about the optical axis proportionally to the relations of the said reflecting system. Whereas, in itself, the possibility of turning the test object and the stops would cause a simultaneous turning of the images of the test marks and the illuminated parts of the surface of the eye fundus, which images are produced in the observation instrument, using a rotatable mirror system and fixed stops provides the possibility to eliminate the turning movements in the field of view of the observation instrument. For this purpose it is necessary to so place the mirror system in the path of the illumination rays that it is passed at the same time by the path of the observation rays. Thus the observer is afforded the view of the image always in unaltered angular position and the adjustment is greatly facilitated.

In the instruments known so far the usual practice was to have the illumination device arranged approximately at right angles to the observation device and to deviate the path of the illumination rays in the direction of the path of the observation rays by a mirror system, which was achieved, for example, by placing the said mirror system outside the optical axis so as to avoid obstructing the examination. Use was made also of half-transparent mirror systems which were adapted to deviate the path of illuminaton rays in the said manner, whereas, apart from undesired losses of light, the examination could be freely effected. The new instrument not requiring the hitherto necessary rotation of the illumination device about the optical axis, it is advisable to mount the light source in the stand of the instrument, whereby a mirror system of which only the central part needs to be transparent for the observation rays can be used for deviating the illumination rays in the direction of the optical axis. The illumination rays belonging without exception to non-axial ray pencils, the way through the mirror system is free for the observation rays that form an axial pencil.

It has been already mentioned that, owing to the division of the test object into two test marks adjustable in two different planes, the examination of an eye affected with astigmatism requires only one displacement of one of the two test marks and thus allows of passing from measuring the refractive power in the plane of one principal section to measuring in the plane of the other principal section, whereby the once effected adjustment of the other test mark remains unaltered. Quite in accordance with how the displacement device for the test marks is provided, the adjustment of these marks must be effected in such a way that first always either the test mark belonging to the stronger or that belonging to the weaker refracting principal section is adjusted, eventually by displacing both test marks conjointly, and that, then, the second adjustment is effected by displacing the other test mark relatively to the one adjusted first. To facilitate the manipulation of the instrument it is advisable to so couple at least one part of the observation instrument with the test object that the adjustment of the first displaced test mark, which displacement may be effected in a given case only together with the other test mark, is made automatically and that the first test mark remains in its position when the other test mark is displaced along the optical axis. This is possible, for instance, when the whole observation instrument is rigidly connected with the test mark to be adjusted first. However, when the observation instrument consists of several optical members, as a microscope or a telescope magnifier for instance, it may be desired to have the ocular of the instrument suffer only the slightest possible displacements in the direction of its optical axis. This requirement is complied with by so coupling the objective, or alternatively the objective and the magnifier, with the test object that the said part effects movements which are reduced in proportion to the scale of the images and are reverse to those of the one test mark, whereby the plane in which the image is produced inside the observation instrument and which coincides with the ocular image plane is maintained. For the adjustment relative to the test mark belonging to the second principal section plane only the displacement of the ocular, which is also reduced in proportion with the image scale, is required.

Figure 3:
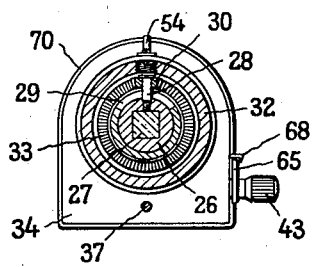
Figure 4:
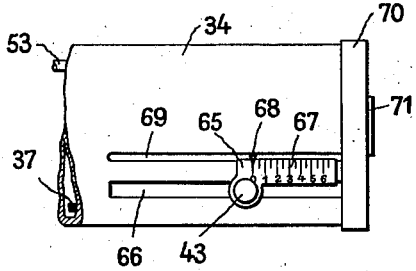
Figure 8:
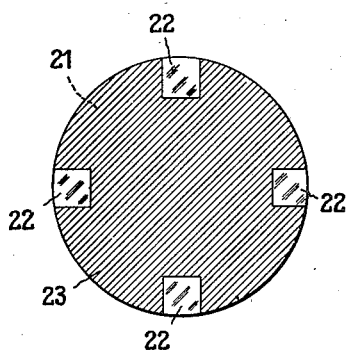
Figures 5, 6:
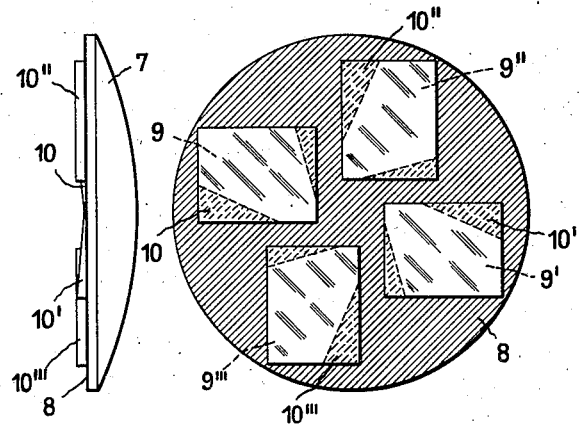
Figure 7:
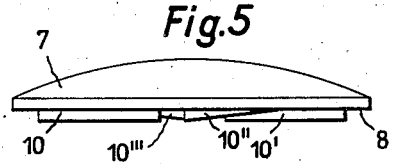
Figure 9:
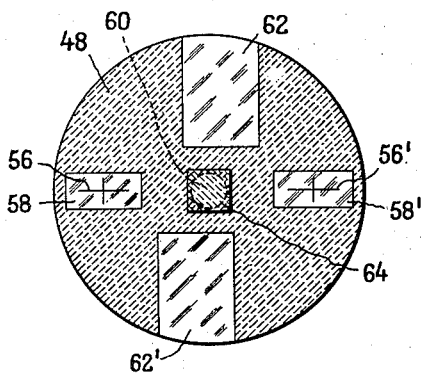
Figure 10:
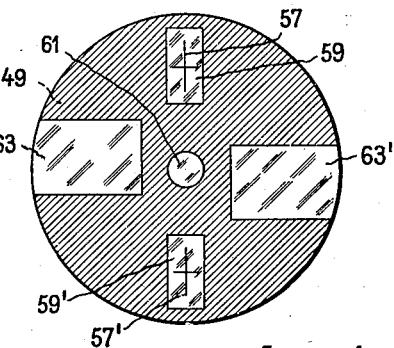

The accompanying drawings illustrate a constructional example of the invention. Figure 1 shows the instrument in a central section in elevation, and Figure 2 a section along the line A—A in Figure 1. Figure 3 represents a section along the line B—B in Figure 1, and Figure 4 the view of a part of the instrument in the direction of the arrow C in Fig. 2. Figures 5, 8, 9, and 10 represent on an enlarged scale a view in the direction of the illumination rays of single optical parts of the instrument, and Figures 6 and 7 show the object of Fig. 5 in two elevations at right angles to each other, respectively.

The instrument has a foot 1 in which a light source, an incandescent bulb 2, is provided. In this foot 1 is disposed also an illumination tube 3 which can be turned about its axis. The illumination tube 3 contains a two-lens condenser 4, a stop 5 with square central aperture 6, and a plano-convex lens 7 for splitting up the pencil of illumination rays. A non-transparent silver foil 8 applied to the plane surface of this lens 7 acts as a stop. In this silver foil 8 remain unsilvered four hexagonal surfaces 9, 9', 9", 9''', which are arranged as explained in the drawings. To the unsilvered, and therefore transparent, parts of the lens 7 are cemented prisms 10, 10', 10", 10''' of identical refraction angles. On the upper end of the illumination tube 3 is rotatably disposed a bevel-wheel rim 11 fast with a milled head 12 having below a conical ring 14 with a scale 13 representing dioptres. By means of a ring 15 which is screwed on the tube 3 and has an index 16 coacting with the scale 13, the said bevel-wheel rim 11 is prevented from being displaced in axial direction.

Over the end of the illumination tube 3 is screwed a mirror case 17. This case contains a plane mirror 18 whose angle of inclination allows of being adjusted relatively to the axis of the illumination tube 3 by means of a milled head 19 provided outside. The mirror 18 has a central conical viewing aperture 20. Closely below the mirror 18 is a plano-convex lens 21 whose plane surface, with the exception of four non-axial approximately square light-passage apertures 22, is covered by a black non-transparent coat 23. The mirror case 17 is covered above by a cap 24 and connects on two sides with the examination instrument proper and with the viewing apparatus.

Opposite the reflecting surface of the plane mirror 18 the mirror case 17 is connected with a tubular sleeve 25 in which a prism support 26 and a reversing prism, system Dove, 27 can be turned by means of a screw bolt 28 which goes through a slit in the sleeve 25 and connects with a planet wheel 30. This planet wheel 30 engages with bevel-wheel teeth 31 belonging to a head 32 which turns on the sleeve 25, and with a bevel-wheel rim 33 screwed to the sleeve 25 and rigidly connected with a case 34. In this case 34, in a guide 36, is disposed a slide 35 which can be displaced by means of a spindle 37 supported in the casing 34 and in the illumination tube 3. The spindle 37 carries a bevel wheel 38 engaging with the bevel-wheel rim 11. The slide 35 itself carries in its turn a guide 39 in which another slide, 40, is displaceable by means of a pinion 41 and a rack 42, which are actuated by a milled head 43.

Each of the slides 35 and 40 has a ring, 44 and 45, respectively. In these rings 44, 45 are rotatable the frames 46 and 47, respectively, of two plano-parallel glass plates 48 and 49 which for this purpose are provided with forks 50 and 51, respectively. With these forks 50, 51 engages a catch pin 53 which is screwed in the head 32 and through a semi-circular slit 52 goes into the case 34. Accordingly, the angular values indicated on a graduation 55 of the casing 34 by an index 54 connected to the head 32 correspond to the angles over which, after having left their initial position, the glass plates 48, 49, together, have been turned about the axis.

On those two surfaces of the plates 48, 49 which face each other are provided the test marks which consist of two cross marks 56, 56' and 57, 57', respectively. The two pairs of cross marks lie on two diameters of the glass plates 48, 49, which are perpendicular to one another. With the exception of, respectively, rectangular surfaces 58, 58' and 59, 59' and central circular surfaces 60 and 61 and further pairs of approximately rectangular surfaces, 62, 62' and 63, 63', the glass plates 48, 49 are blackened so as to prevent the passage of light. The rectangular surfaces 58, 58' and 59, 59' contain the cross marks, and the circular surfaces 60 and 61 as well as the pairs of surfaces 62, 62' and 63, 63' serve the purpose of providing the passage to the other glass plate, 49 and 48, respectively, for the partial ray pencils coming from the rectangular surfaces 58, 58' and 59, 59'. The circular central surface 60 is covered by a green filter 64. The axis of the pinion 41 which is supported by the slide 35 rests also in a slide 65 which is displaceable in a longitudinal slit 66 of the casing 34 and has a dioptric scale 67. With this scale 67 coacts an index 68 which is fixed to the slide 40 and goes into the casing 34 through a longitudinal slit 69.

The case 34 is covered by a cap 70 which holds the frame 71 of a refractometer lens 72. The optical axis of this lens 72 goes through the centre of the glass plates 48, 49, coincides with the axis of the Dove prism 27, and rectangularly intersects the axis of the illumination system in the reflecting surface of the mirror 18.

Opposite the sleeve 25 an arm 73 with a telescope sleeve 74 is cast on the mirror case 17. In this sleeve 74 is axially displaceable an objective tube 75 which a bolt 77 going through a slit 76 prevents from turning. The front part of this objective tube 75 is constructed as a frame for an objective 78 and provided with an exterior thread 79 meshing with the corresponding interior thread of a spur wheel 80. This spur wheel 80 is mounted in the mirror case 17 for rotation about the axis of the objective 78, which, outside the mirror 18, coincides with the elongation of the axis of the refractometer lens 72. On a bolt 81 provided in the illumination tube 3 is rotatably disposed a toothed-wheel body having spur-wheel teeth 82 and bevel-wheel teeth 83 which, respectively, mesh with the teeth of the spur-wheel 80 and with the bevel-wheel rim 11. The objective 78 represents the objective of a telescope lens which is completed by an ocular 85 adjustable by means of a thread 84.

As soon as the incandescent lamp 2 is connected to a suitable current circuit, the condenser system 4 images the glowing incandescent filament on the square stop aperture 6. The aperture 6, now luminous, is imaged by the lens 7 on the plane surface of the lens 21. Owing to the only available non-blackened parts of the lens 7, viz. the hexagonal surfaces 9, 9', 9'', 9''', being covered by diverging prisms 10, 10', 10'', 10''' the projection is not effected in the centre but on marginal parts of the lens surface 21 and this by means of partial pencils of rays which are deviated to one side of the optical axis so as to illuminate the light-passage apertures 22 of the said lens surface 21.

The patient whose eye, 86, is to be examined takes such a position in front of the instrument that the optical axis of the lens 72 coincides with that of this eye 86 and the four luminous stop apertures 22 are imaged by this lens 72 on the pupil of the eye, whereby the pencils of imaging rays are deviated by the mirror 18 and pass through the prism 27 and the two glass plates 48 and 49. The glass plates 48 and 49 must be brought together as near as possible so that the test marks lie approximately in one plane and the index 68 points at the value zero on the scale 67. The mirror 18 is to be inclined by an angle of 45° towards the optical axis by the refractometer lens 72 as well as towards the illumination system 4, 7, 21; moreover the prism 27 must be adjusted in such a manner that its reflecting surface lies horizontally below, whereby the index 54 points at the value zero on the scale 55.

Suppose the eye to be examined, 86, is normal-sighted. When the accommodation of the eye is relaxed, the optical system of the eye images a far object sharply on the fundus of the eye. Consequently, when by turning the head 12 the slides 35 and 40 are displaced so far that the index 16 indicates the value zero on the scale 13, whereby the refractometer lens 72 images the cross marks 56, 56' and 57, 57' at a great distance, an image of these marks is projected on the fundus of the eye. This image, together with the surrounding parts of the fundus of the eye, is imaged in the reverse way by the optical system of the eye 86 and the refractometer lens 72 in the planes of the cross marks 56, 56' and 57, 57'.

The gear consisting of the spindle 37, the bevel wheels 38, 11, and 83, the spur-wheels 82 and 80, and of the thread 79 is given such a ratio of transmission that, regardless of the adjustment it is given in each instance, the objective 78 projects an image of the plane of the cross marks 56, 56' always in the same plane. The imaging rays pass the prism 27 and the central aperture 20 of the mirror 18. The ocular 85 must be adjusted to this image plane by turning it on the thread 84. An observer looking through the ocular is then confronted with the view of the cross marks 56, 56' and 57, 57' in horizontal and vertical positions, respectively, and perceives the normal-sightedness of the eye under examination, 86, by the image of the mark images which lie in the fundus of the eye and are projected by the optical system of the said eye and by the refractometer lens 72 in the mark plane, coinciding completely with the marks 56, 56' and 57, 57' themselves. The eye under examination, 86, itself sees the marks sharply confined together with the circle 60 having a faint green shine, which serves as its fixing point.

In case the eye 86 is axially symmetrically ametropic, the mark image appears either in front of or behind the fundus of the eye; however, it can be brought on the surface of the fundus of the eye by turning the head 12 and so displacing the slide 35. The observer at the ocular 85 discerns the anomalous refraction of the optical system of the eye 86 by the unsharp images of the marks which, failing to cover the marks 56, 56' and 57, 57', appear laterally displaced. This parallax of the image is caused by the deflected course of the pencils of imaging rays from the object to the eye 86. The value of the displacement of the slide required to neutralize the parallax furnishes a measure for the determination of the ametropia of the eye 86 and also of the vertex refraction value of a spectacle lens required to correct the ametropia of the eye 86. For this reason the scale 13 must have a division allowing the index to indicate direct in dioptres the refraction value of the principal point and the vertex refraction. This causes unequal intervals when the instrument is to serve for finding the refractive value of the principal point of the eye; for finding the vertex refraction value of a spectacle lens for correction of ametropia the intervals of the division 13 will be equal.

If the eye under examination 86 is affected with astigmatism, the supposed coincidence position of the glass plates 48, 49 will at first allow to image distinctly, and to cover, only one of the pairs of marks, 56, 56' or 57, 57'. The respective position of the slide 35 is determined quite in the same manner as in the case of axially symmetrically constructed eyes by means of the pairs of marks 56, 56', whereby however, by turning the head 32, the glass plates 48, 49 must be turned so long until not only the radial lines of this pair of marks, 56, 56', but also the lines perpendicular thereto appear to cover their images. In this way the position of the one plane of the principal section of the astigmatic eye 86 is ascertained; the respective angular value is pointed at on the scale 55 by the index 54. To the other plane of the principal section belongs an angular value deviating by 90°.

When the glass plates 48, 49 are turned by means of the head 32, the prism 27 and its frame 26 being as they are connected to the planet wheel 30, are turned in the same sense and by an amount that is equal to half the angular value. This rotation causes the pencils of illumination rays emanating from the stop apertures 22 to be so turned that they send the light unaltered to the quadrilaterals 58, 58' and 59, 59'. On the other hand, however, also the pencils of imaging rays emanating from the marks 56, 56' (and 57, 57') and their images, which go to the objective 78, are turned but in the opposite sense, which makes the observer at the ocular 85 see the test object always in one and the same position. Contrary thereto, owing to the rotations, the eye under examination, 86, is presented the view of the test object in a different angular position.

As soon as the refractive power of the eye under examination, 86, has been so determined for one of the principal section planes, the slide 40, by turning the head 43 by means of the pinion 41 and the rack 42, is displaced in the direction of the optical axis and relatively to the slide 35, which has to remain in its position, until also the image of the marks 57, 57' is covered by these marks themselves. The last named pair of marks no longer permitting to be imaged in the ocular image plane used hitherto, the examining person has to axially displace at the same time the ocular 85 by turning it on its thread 84. The index 68 indicates on the scale 67 the value of the astigmatic difference for the two principal-section planes of the eye 86. It is important to take into consideration that no alteration in the accommodation of the eye 86 is permitted to have taken place in the interval between the examinations of the two principal-section planes. For this reason the astigmatic difference having been measured, it is advisable to examine the refractive power of the eye 86 once more in the first examined principal-section plane by screwing the ocular 85 back into its initial position.

With regard to the different stops provided in the instrument the following is to be said: In order to avoid an undesired strain or an injuring of the eye 86, the path of illumination rays is stopped down as much as possible. Moreover observation is easier and the images turn out the clearer the more rigourously the path of the observation rays is separated from the illumination rays and the less dispersed light is permitted to strike the paths of the imaging rays. The diffused light which is still present to a small extent, affords a sufficient illumination of the circular surfaces 60 and 61. Considering these necessities the stop apertures 62, 62' and 63, 63' must have the form of the cross sections of the partial pencils of illumination rays which, when the glass plates 48 and 49 take their outermost positions, pass through the quadrilaterals 58. 58' and 59, 59'. If so required, also the free aperture of the refractometer lens 72 may be stopped down partially. The form of their stop apertures would likewise be found by following the path of the illumination rays when the glass plates 48 and 49 are in their extreme positions; it would be a figure that is geometrically equal to the stop 8 and its apertures 9, 9', 9'', and 9'''. The stop of the refractometer lens 72 corresponds to the image of the stop 8 as produced by the lens 21, wherefrom, reversely, can be deduced the form of the hexagonal surfaces 9, 9', 9'', and 9''' and their position in the stop 8. When so choosing the stop apertures the consequence is that in each instance only one of the non-axial pencils of illumination rays illuminates each of the quadrilaterals 58, 58' and 59, 59' and, consequently, that only one image of each of the marks 56, 56' and 57, 57' appears in the fundus of the eye. When use is made of the said partial stopping down of the aperture of the lens 72, it has to be taken into consideration, however, that this stopping down must take part in the turning movements of the glass plates 48 and 49. In this case, as described hereinbefore, the stop may be provided, for instance, by blackening or non-transparently silvering a lens surface, the only further requirement being that the mount 71 of the lens 72 is rotatable in the cap 70, whereby the mount 71 may be coupled with the mounts 46 and 47 by means of the catch 53.

I claim:

1. In an instrument for objectively determining the refractive power of the principal point of an eye and the vertex refraction of the spectacle lens required to correct ametropia, a case, two test marks each lying in a plane perpendicular to the optical axis of the instrument and being provided in the case for rotation about and displacement in the direction of the said optical axis, means permitting to displace the test marks independently of each other as well as conjointly, a light source disposed on the case, deviating means provided in the case and adapted to direct to the test marks a plurality of non-axial partial pencils of rays of the rays emitted by the light source, a lens system disposed between the light source and the test marks, a lens provided in the end of the case and adapted to produce together with the eye lens an image of the test marks on the fundus of the eye, and an observation instrument attached to the case and being adapted to observe the test marks as well as the image of the fundus of the eye under examination, which is produced by the said lens and the lens of the said eye.

2. In an instrument for objectively determining the refractive power of the principal point of an eye and the vertex refraction of the spectacle lens required to correct ametropia, a case, two test marks each lying in a plane perpendicular to the optical axis of the instrument and being provided in the case for rotation about and displacement in the direction of the said optical axis, means for displacing the test marks, a light source disposed on the case, four wedges provided in the case and adapted to produce of the rays of the light source four partial non-axial pencils of rays, a stopping disc disposed in the path of the rays and having four apertures each of which is adapted to pass one of the said partial pencils of rays to one of the two halves of the two test marks, a lens system disposed between the light source and the test marks, a lens provided in the end of the case and adapted to produce together with the eye lens an image of the test marks on the fundus of the eye, and an observation instrument attached to the case and being adapted to observe the test marks as well as the image of the fundus of the eye under examination, which is produced by the said lens and the lens of the said eye.

3. In an instrument for objectively determining the refractive power of the principal point of an eye and the vertex refraction of the spectacle lens required to correct ametropia, a case, two test marks each lying in a plane perpendicular to the optical axis of the instrument and being provided in the case for rotation about and displacement in the direction of the said optical axis, means for displacing the test marks, a light source disposed on the case, deviating means provided in the case and adapted to direct to the test marks a plurality of non-axial partial pencils of rays of the rays emitted by the light source, a lens system disposed behind the light source, behind the lens system a mirror permitting the passage of light and adapted to deviate the said non-axial partial pencils of rays approximately in the direction of the optical axis of the instrument, a reflecting prism rotatably mounted between this mirror and the test marks, means coupling the prism to the test marks in such a manner that, whenever the test marks are turned, the prism rotates about proportional angles, a lens provided in the end of the case and behind the said mirror and being adapted to produce together with the eye lens an image of the test marks on the fundus of the eye, and an observation instrument attached to the case and being adapted to observe the test marks as well as the image of the fundus of the eye under examination, which is produced by the said lens and the lens of the said eye.

4. In an instrument according to claim 1, means for so coupling at least part of the observation instrument to the test marks that the observation instrument remains sharply focussed when the test marks are displaced conjointly.

5. In an instrument for objectively determining the refractive power of the principal point of an eye and the vertex refraction of the spectacle lens required to correct ametropia, a case, two test marks each lying in a plane perpendicular to the optical axis of the instrument and being provided in the case for rotation about and displacement in the direction of the said optical axis, means for displacing the test marks, a light source disposed on the case, deviating means provided in the case and adapted to direct to the test marks a plurality of non-axial partial pencils of rays of the rays emitted by the light source, a lens system disposed between the light source and the test marks, a lens provided in the end of the case and adapted to produce together with the eye lens an image of the test marks on the fundus of the eye, an observation instrument attached to the case and being adapted to observe the test marks as well as the image of the fundus of the eye under examination, which is produced by the said lens and the lens of the said eye, a reflecting prism rotatably disposed between the said deviating means and the test marks, and means coupling the prism to the test marks in such a manner that, whenever the test marks are turned, the prism rotates about proportional angles.

6. In an instrument for objectively determining the refractive power of the principal point of an eye and the vertex refraction of the spectacle lens required to correct ametropia, a case, two test marks each lying in a plane perpendicular to the optical axis of the instrument and being provided in the case for rotation about and displacement in the direction of the said optical axis, means for displacing the test marks, a light source disposed on the case, deviating means provided in the case and adapted to direct to the test marks a plurality of non-axial partial pencils of rays of the rays emitted by the light source, a lens system disposed between the light source and the test marks, a lens provided in the end of the case and adapted to produce together with the eye lens an image of the test marks on the fundus of the eye, an observation instrument attached to the case and being adapted to observe the test marks as well as the image of the fundus of the eye under examination, which is produced by the said lens and the lens of the said eye, a reflecting prism rotatably disposed between the said deviating means and the test marks, and means coupling the prism to the test marks in such a manner that, whenever the test marks are turned, the prism rotates about proportional angles, the prism lying at the same time in the path of the rays of the observation instrument attached to the case.

HANS HARTINGER.